Nov. 30, 1965    R. C. KASIDAS    3,220,753
HOSE COUPLING
Filed Oct. 13, 1964

United States Patent Office 3,220,753
Patented Nov. 30, 1965

3,220,753
HOSE COUPLING
Ray C. Kasidas, Waterbury, Conn., assignor to Scovill
Manufacturing Company, Waterbury, Conn., a corporation of Connecticut
Filed Oct. 13, 1964, Ser. No. 403,542
1 Claim. (Cl. 285—174)

This application is a continuation-in-part of application Serial Number 260,251, filed February 21, 1963, and now abandoned.

The invention relates to house couplings, and more particularly to an improved non-separable three-piece female coupling adapted to be connected as a unit to the end of a flexible hose, and to an improved process of making the same. This avoids the necessity on the part of the hose manufacturer of handling separate parts during the process of connecting the coupling to the end of the hose.

The general object of the invention is to provide an efficient unitary coupling which can be easily assembled to the end of a flexible hose. It is an important object of the invention to provide an improved three-piece hose coupling assembly of the kind described which is capable of being manufactured economically by a single assemble operation with relatively simple tools, and which does not require more than the normal manufacturing tolerances in the parts themselves.

Another object is to provide a coupling assembly of the type described wherein the outer ferrule has an axially extending neck projecting through the usual hole in the coupling nut, which neck fits tightly around a slightly enlarged portion of the nipple. This not only helps to provide a rigid anchorage of the ferrule, but strengthens the end wall of the ferrule against twisting the pulling stresses.

A further object is to provide such a three-piece assembly and process of making the same which will require only a single stepped diameter of the nipple adjacent the nut so as to preserve the maximum area of the ferrule flange inside the neck as a bearing for a sealing washer.

In the accompanying drawing, I have shown for purpose of illustration, one embodiment which the invention may assume in practice. In the drawing.

Figure 2:
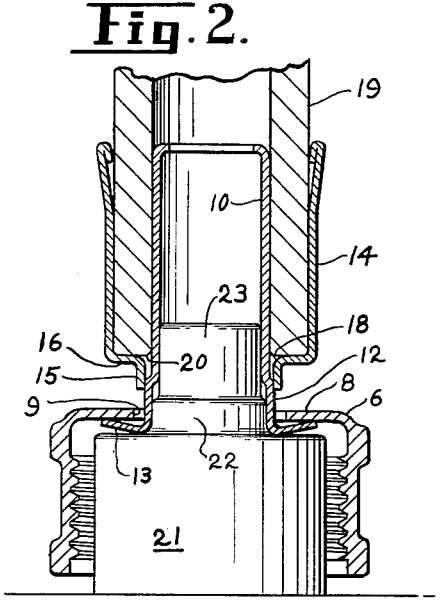
FIG. 2 is a vertical section showing the initial phase of the assembly operation.

The coupling consists of a common form of swivel nut 6 having internal threads 7, and at one end, a wall or inturned flange 8 with a central aperture 9, as best seen in FIG. 2. The internal nipple has a smaller diameter portion 10 adapted to fit inside a flexible hose (not shown) and a stepped or larger diameter portion 12 which extends through the aperture 9 in the nut and has an out-turned flange 13 engaging behind the inturned flange 8 of the nut.

The third piece of the assembly is a ferrule having a large diameter portion 14 which is adapted to surround the end of the hose, a reduced neck 15 at one end having a smooth exterior surface fitting tightly around the smooth exterior surface of the larger diameter portion 12 of the nipple and having a loose fit in the aperture 9 of the nut so that the nut can swivel freely in the channel between the flange 13 of the nipple and the adjacent surface of the radial end wall 16 of the ferrule.

To complete the description of the finished assembly, the parts are held together by an external rib 17 bearing against the rounded shoulder 18 at the juncture of the neck 15 and the end wall 16.

Figure 1:
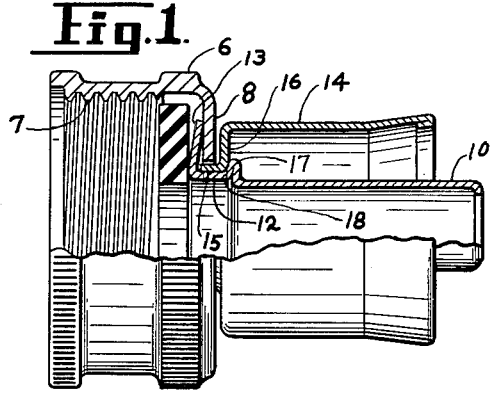
FIG. 1 is a side view partly in section of my improved coupling assembly.
Figure 3:
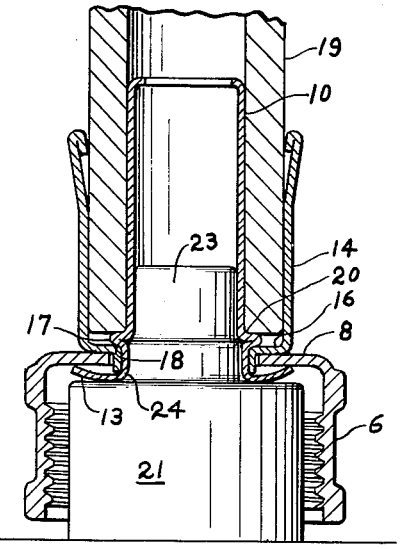
FIG. 3 is a similar view showing the next step in the assembly process.

Considering the process of assembly, it will be obvious in FIG. 2 that the larger diameter portion 12 of the nipple is somewhat longer than in the finished assembly. A hollow cylindrical punch 19 fits into the outer bore of the ferrule larger portion 14 and bears against the end wall 16. The inside diameter of the ferrule neck 15 is slightly less than the outer diameter of the larger portion 12 of the nipple so that as the punch comes down, it will push the neck 15 into place with a force-fit around such portion 12 of the nipple. The punch 19 has an internal rounded corner 20, and when this comes to bear against the larger diameter portion 12 of the nipple, it will upon continued movement, upset the material in an axial direction to form the rib 17 which will obviously be forced into tight engagement with the internal rounded shoulder 18 so as to form a leak-proof joint. The completion of this part of the process is indicated in FIG. 3, and the limit of movement of the punch in this case, is controlled by the stroke of the press itself. The end-wise pressure is resisted by a bottom anvil 21 bearing against the end of the nipple inside the nut 6.

The anvil 21 has a plug or extension with two diameters —the larger one 22 being adapted to fit inside the larger diameter portion 12 of the nipple, while the other which is designated 23, will extend into the barrel 10 of the nipple.

Figure 5:
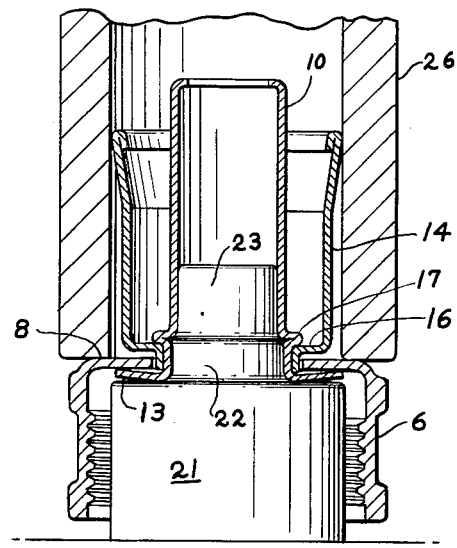
FIG. 5 is a vertical section showing the final assembly step.
Figure 4:
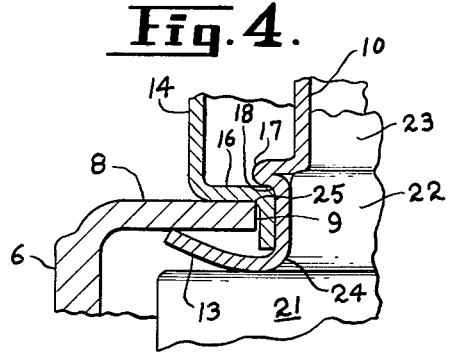
FIG. 4 is a fragmentary view on an enlarged scale with the parts at the same stage as FIG. 3.

When the metal of the larger diameter portion 12 of the nipple is upset by end-wise pressure, as indicated in FIGS. 3 and 4, the heavy pressure on the rounded corner 24 will tend to tilt or curl the flange 13 upwardly. Also, during this step in the process, the swivel nut end wall 8 will jam tightly into the interior corner 25 of the ferrule so that an additional operation is required to free the nut because it is jammed between the corner 25 and the tilted flange 13 (see FIG. 4). This is accomplished as shown in FIG. 5 by a hollow punch 26 which is brought to bear against the flange 8 of the coupling nut 6 while the parts are supported on the anvil 21. This not only frees the binding action of the nut against the corner 25, but also straightens the flange 13, which of course, is desirable in order to get a suitable bearing against the sealing washer which is always used in the swivel nut. At the finished stage, this flange 13 may be brought into a position substantially at right angles to the coupling axis, or it may be left slightly inclined, as seen in FIG. 5.

As a result of my invention, it will now be evident that an improved process and product is available for supplying a complete three-piece non-separable assembly which can be economically manufactured by a simple set of tools, and which is most convenient for the hose manufacturer to apply to the end of the hose.

What I claim is:

A hose coupling assembly comprising
(a) an internally threaded nut having an end wall with a central aperture providing an inturned flange at one end;
(b) a sheet metal nipple having an expandible smaller diameter portion adapted to extend into the hose, a larger diameter portion with a smooth outer surface extending through said aperture in the nut, and an out-turned flange engaging behind said inturned flange on the nut;
(c) a sheet metal ferrule having a larger diameter portion adapted to surround the end of the hose and a reduced cylindrical neck at one end providing a rounded internal shoulder adjacent said nipple, said large diameter portion and said neck being joined by a radial wall, said neck extending through the aperture in said nut and bearing endwise against said out-turned flange of the nipple, said neck also having a smooth interior surface fitting tightly around said larger diameter portion of the nipple; and
(d) all of said parts being held together by an external rib upset from the material of said nipple and bearing tightly against said rounded internal shoulder,
(e) whereby there is provided a rigidly united three-piece assembly adapted to be connected as a unit to the end of a flexible hose.

References Cited by the Examiner

UNITED STATES PATENTS

| | | | |
|---|---|---|---|
| 743,401 | 11/1903 | Sherman | 285—258 |
| 2,142,752 | 1/1939 | Howard | 285—257 |
| 2,338,666 | 1/1944 | Nelson | 285—258 X |
| 2,346,035 | 4/1944 | Ladden | 29—537 |
| 2,374,225 | 4/1945 | Melsom | 285—149 |
| 2,481,730 | 9/1949 | Doerr | 285—174 |
| 2,568,911 | 9/1951 | Cox et al. | 29—537 |
| 2,631,047 | 3/1953 | Splender et al. | 285—174 |
| 2,808,643 | 10/1957 | Weatherhead | 285—258 |
| 2,825,588 | 3/1958 | Howard | 285—258 |
| 3,148,898 | 9/1964 | Somers | 285—149 |

FOREIGN PATENTS 91,797   9/1961   Denmark.

CARL W. TOMLIN, *Primary Examiner.*

THOMAS F. CALLAGHAN, *Examiner.*